United States Patent
Melville et al.

(10) Patent No.: US 7,280,520 B2
(45) Date of Patent: Oct. 9, 2007

(54) VIRTUAL WIRELESS LOCAL AREA NETWORKS

(75) Inventors: Graham David Melville, Morgan Hill, CA (US); Richard Montgomery, Saratoga, CA (US); Ray Martino, Saratoga, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 791 days.

(21) Appl. No.: 10/773,931

(22) Filed: Feb. 6, 2004

(65) Prior Publication Data

US 2004/0228319 A1    Nov. 18, 2004

Related U.S. Application Data

(60) Provisional application No. 60/445,381, filed on Feb. 6, 2003.

(51) Int. Cl.
*H04Q 7/24* (2006.01)
(52) U.S. Cl. ........................... 370/338; 370/409
(58) Field of Classification Search ................ 370/310, 370/328, 338, 409; 709/220; 455/422.1
See application file for complete search history.

(56) References Cited

U.S. PATENT DOCUMENTS

| | | | |
|---|---|---|---|
| 6,618,763 B1 | 9/2003 | Steinberg | 709/246 |
| 2003/0171119 A1 | 9/2003 | McIntosh | |
| 2004/0003060 A1* | 1/2004 | Asoh et al. | 709/220 |
| 2004/0037259 A1 | 2/2004 | Steinberg | |
| 2004/0122956 A1* | 6/2004 | Myers et al. | 709/228 |
| 2005/0025160 A1* | 2/2005 | Meier et al. | 370/395.53 |
| 2005/0180367 A1* | 8/2005 | Dooley et al. | 370/338 |
| 2007/0109994 A1* | 5/2007 | Beach | 370/328 |

\* cited by examiner

*Primary Examiner*—Nguyen T. Vo
(74) *Attorney, Agent, or Firm*—Baker Botts LLP

(57) ABSTRACT

A method of operating multiple virtual wireless networks using a common distribution system. Multiple radio frequency side networks are attached to multiple wired networks through a single access point. In this way messages may be sent between a mobile unit and a local area network. The mobile units and the local area networks are associated with identifiers which are used to route a sent message. The messages are sent from a mobile unit to a corresponding access point, which compares the identifier of the mobile unit with stored identifiers in its memory and assigns tags to the messages according to the intended local area network. The tagged messages are then sent from the access point to the distribution system that routes the message to the corresponding portal and to the local area network.

8 Claims, 3 Drawing Sheets

VIRTUAL WIRELESS LOCAL AREA NETWORKS

This application claims benefit of the provisional application 60/445,381 filed on Feb. 06, 2003.

This invention relates to wireless local area networks. In particular, the invention relates to wireless local area networks wherein multiple systems can be accommodated over common hardware to provide a wireless virtual local area network.

BACKGROUND OF THE INVENTION

Wireless data communications systems following the communication protocol of IEEE Standard 802.11 are already known. In these systems, mobile units are in data communication with a central computer or other data processing device through access points. The access points may communicate with the computer over an Ethernet wired network. Each mobile unit associates with one of the access points.

In some situations multiple systems may require the use of local area networks and wireless local area networks in the same physical space. Such needs may arise in an airport environment, wherein multiple users may include airport operations, police or security and airlines. Such need may also arise in the case of a corporate reorganization when two companies temporarily occupy the same physical space. In such situations it becomes desirable for data communications to be routed through the same access points for multiple systems to avoid the need to install duplicate access points.

Virtual local area networks (VLANs) are known wherein networks may serve multiple users with the same hardware. IEEE Standard 802.1Q defines internal frame logging to identify VLAN membership for a data packet.

It is therefore an object of the present invention to provide a method and apparatus for servicing mobile units communicating with multiple systems through a common access point.

SUMMARY OF THE INVENTION

In accordance with the invention there is provided a method for operating multiple virtual wireless networks using a common distribution system. The distribution system is connected to multiple local area network servers through portals. Each portal is associated with a tag for identifying messages for an associated local area network. Each local area network associated with a portal has an associated wireless service set identification. At least one access point, which includes a memory, is coupled to the distribution system which can then be used to communicate with mobile units. The mobile units of the system have a service set identification which associates each mobile unit with one of the portals, corresponding to a local area network. Data is provided to the access point memory associating the service set identifications and tags corresponding to the portals. The mobile units will associate with at least one access point by communicating a service set identification from the mobile unit to the access point. Once associated with an access point, the mobile unit can communicate data to the associated access point, which includes the service set identification of the mobile unit. The access point will then relay the data from the mobile unit through the distribution system to the portal corresponding to the local area network that is associated with the service set identification. This relay of data will include verifying that the service set identification is associated with a local area message tag in the access point memory.

In a preferred arrangement, the access points are operated to broadcast beacons having a single primary service set identification. The access point will have one primary service set identification and one or more secondary service set identification, each associated with a local area message tag in the access point memory. The access points communicate with mobile units that have either the primary service set identification or the secondary service set identification. In a preferred arrangement the access point relays data with a tag in each relayed message associated with the service set identification that is included in the message from the mobile unit.

In another embodiment of the invention, the operation of multiple virtual wireless networks using a common distribution system includes providing portals from the distribution system to a plurality of local area network servers. Each portal is associated with a tag for identifying messages for an associated local area network. At least one access point having a memory is coupled to the distribution system. Each of the local area networks associated with a portal is associated with a realm identification. The mobile units likewise have a realm identification that associates the mobile units with one of the portals. Data in the access point memory associates the realm identifications with tags corresponding to the portals. The mobile units are operated so they associate with an access point and communicate the realm identification from the mobile unit to the access point. During association, the mobile unit is associated with one of the tags corresponding to the portals in the access point memory. The access point then relays the data message from the associated mobile unit through the distribution system to the portal corresponding to the local area network associated with the service set identification. The relay of data includes providing a local area message tag that corresponds to the portal associated with the mobile unit.

In accordance with the invention there is provided a system for providing multiple virtual wireless networks. The system includes a distribution system and a plurality of portals coupled to the distribution system, each corresponding to at least one network. Each portal is associated with a tag for identifying messages for the corresponding network. Each mobile unit has a service set identification associating the mobile unit with one of the networks. At least one access point is coupled to the distribution system and includes a memory that contains data associating the service set identifications with tags. The mobile units are arranged to associate with at least one access point. This association includes communicating the service set identification from the mobile unit to the access point. The mobile units send data messages which include the service set identification to the access point. The access points are arranged to relay the data messages from the associated mobile unit through the distribution system, with a local area message tag, to the portal corresponding to the local area network associated with the service set identification, and to verify that the service set identification is associated with the local area message tag of the message.

In a preferred arrangement, the access points are arranged to broadcast beacons that have a single primary service set identification. The access points are arranged to associate with mobile units having one primary service set identification and one or more secondary service set identifications. The primary and secondary service set identifications are associated with a local area message tag in the access point memory. The access point may be arranged to include a tag in each relayed message corresponding to the tag associated with the service set identification included in the message from the mobile unit.

In accordance with the invention there is provided a system for providing multiple virtual wireless networks which consists of a distribution system and a plurality of portals coupled to the distribution system, each portal corresponding to at least one network. Each portal is associated with at least one tag for identifying messages for an associated network. A plurality of mobile units are provided, each having a realm identification associating the mobile unit with one of the networks. At least one access point is coupled to the distribution system and includes a memory which has data associating the realm identifications and the tags. The mobile units are arranged to associate with an access point and communicate the realm identification to the access point. The access points are arranged to relay data messages with a local area message tag, from an associated mobile unit through the distribution system to the portal corresponding to the local area network associated with the realm identification of the mobile unit.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
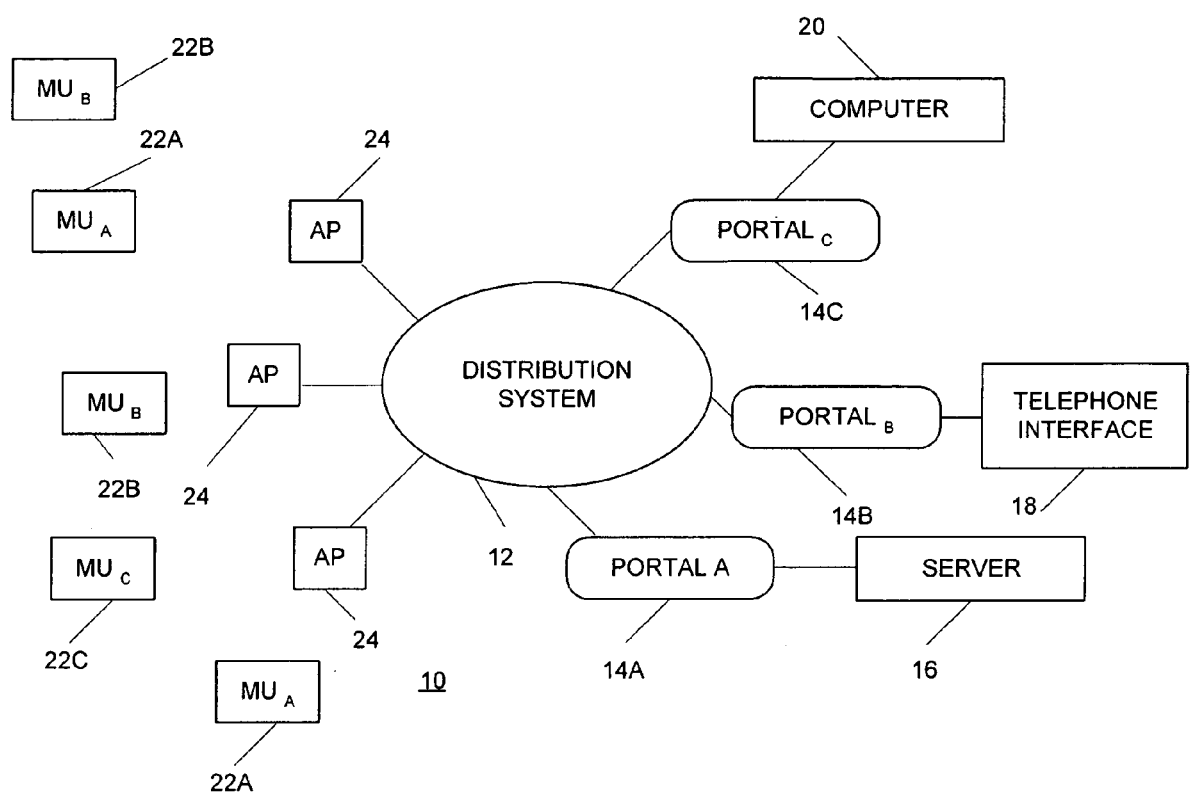
FIG. 1 is a block diagram of a virtual wireless network using a common distribution system in accordance with the present invention.

Referring to FIG. 1, there is shown a virtual wireless network according to one embodiment of the present invention for providing data communication between a local area networks, for example, a computer 20, a telephone interface 18 or a server 16, and mobile units 22. The system uses access points 24 to provide radio packet data communications with the mobile units 22 using a communications protocol, such as IEEE standard 802.11, whereby the radio modules in the mobile units 22 monitor polling signals from the access points 24 and associate with an access point 24 for purposes of data communications. The radio modules of the mobile units and access points may, for example, be identical to those used in the Spectrum 24 system made by the assignee.

In the system of FIG. 1, each local area network, such as computer 20, telephone interface 18 or server 16 is associated with a service set identification or a realm identifier assigned to the particular network and its mobile units. These local area networks are each coupled to distribution system 12 by a portal 14. In the distribution system 12, data messages from mobile units are routed to the appropriate portal using tags included in the messages, such as the tags specified by Standard 802.I.Q. The portal is arranged to receive messages from the distribution system and to relay messages having the associated tag to the local area network coupled to the portal.

The mobile units 22 each have a service set identification or a realm identifier corresponding to the local area network that the mobile units are intended to communicate with. In one arrangement service set identifiers (SSID) as described in Standard 802.11 are used as identifiers in the wireless communication environment. A distinct SSID is associated with each virtual LAN such that data messages are identified by SSID in the wireless domain and by 802.IQ tags in the wired distribution system.

According to an alternate arrangement each virtual LAN can be associated with a realm identifier, as provided in the draft specification of 802.11i. It should be noted that the term "realm" as used herein is not limited to the corresponding realm of Standard 802.11i, but is intended to include other identifiers of a similar nature that can uniquely identify a mobile unit or a packet with a virtual network and tag. The initial packet exchange includes an identification of realm by the mobile unit. Realm identification is associated with organization. The access point can accordingly determine a realm for a mobile unit during the association processing and thereafter provide the appropriate virtual lan tag to messages received from that mobile unit. In this way, each mobile unit 22 communicates an identifier to the access point 24 which provides an association of the mobile unit with a virtual LAN. In the access point memory the identifier corresponding to a mobile unit is verified and associated with a local area message tag for the virtual LAN. The access point 24 can then relay the data messages through the distribution system to the portal 14 corresponding to the local area network associated with the identifier of the mobile unit.

Figure 2:
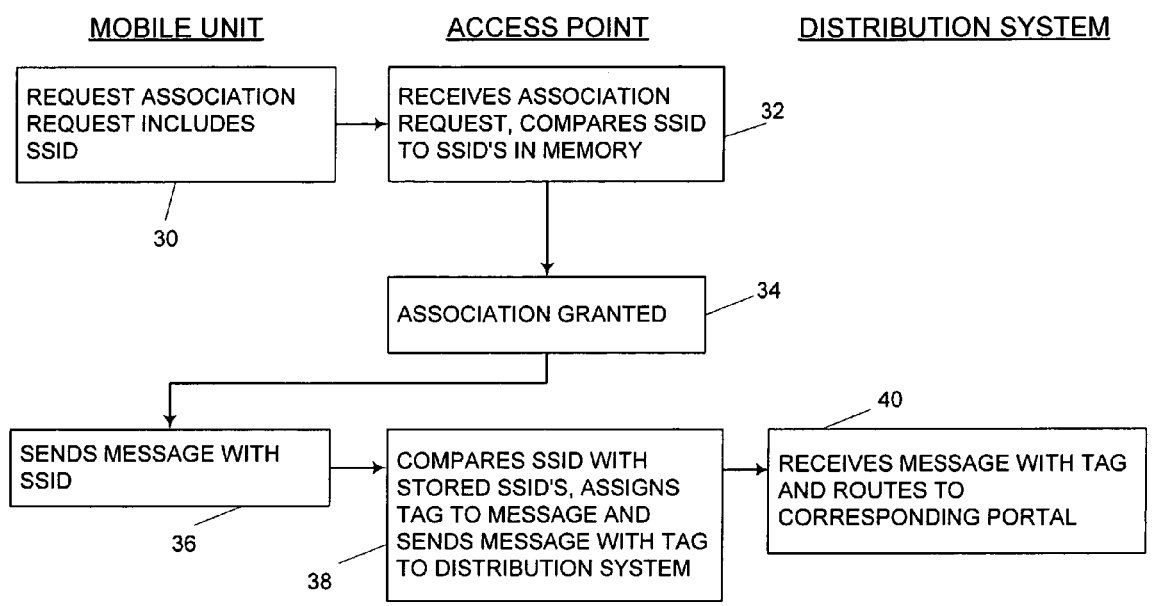
FIG. 2 is a flow diagram illustrating the process of sending a message using a service set identification from a mobile unit to the corresponding portal.

In the example of FIG. 2, each mobile unit is given a service set identification which associates the mobile unit with one of a number of local area networks operating with a common distribution system 12 and common access points 24. When a mobile unit initiates operation and requires association with an access point, the mobile unit monitors beacon messages from access points 24 and selects an access point with which association will be requested. The mobile unit sends an association request 30 along with the service set identification of the mobile unit to the access point 30. The access point receives the association request and compares the service set identification of the mobile unit with the service set identifications in the access points memory at step 32. If the service set identification of the mobile unit corresponds to one of the service set identifications in the memory of the access point, association of the mobile unit is granted at step 34. The mobile unit thereafter sends data messages 36 with the corresponding service set identification to the access point. The access point then compares the service set identification with the stored service set identifications in its memory and assigns a tag to the message at step 38. The tagged message is then sent through the distribution system to the corresponding portal at step 40.

Figure 3:
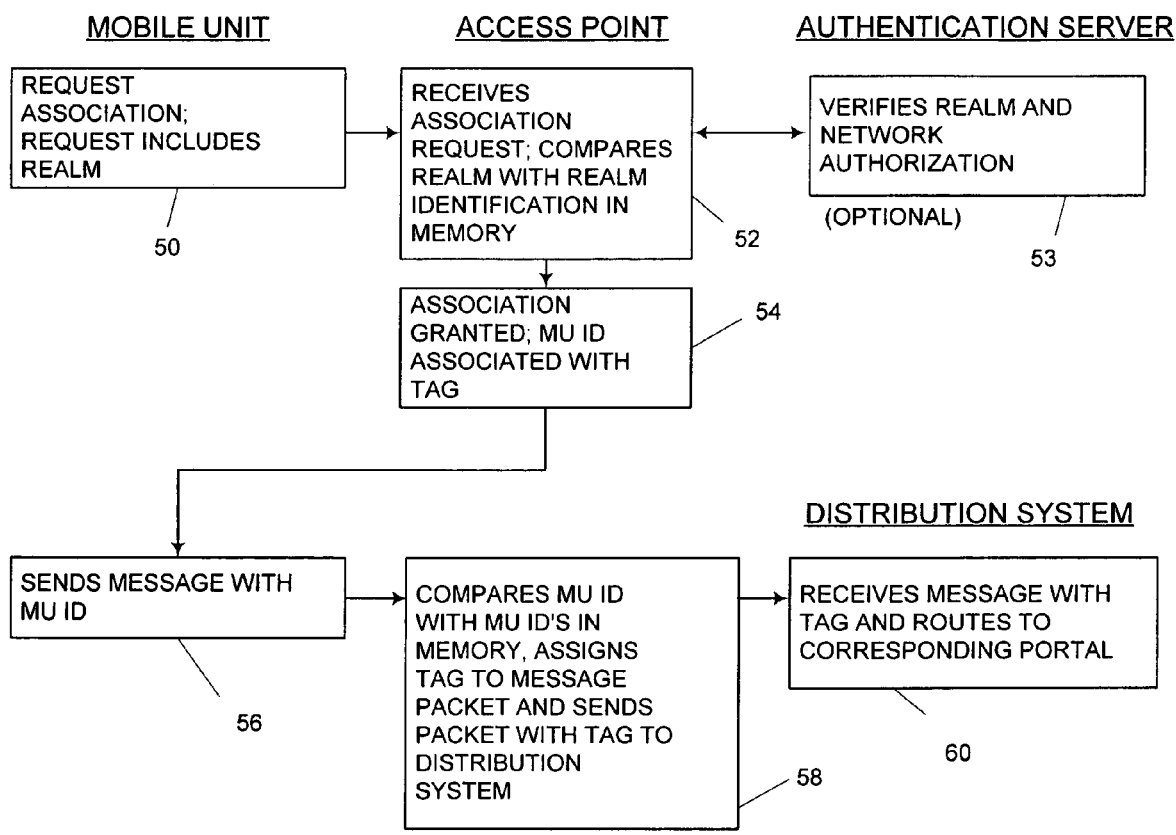
FIG. 3 is a flow diagram illustrating the process of sending a message using a realm identifier from a mobile unit to the corresponding portal.

The example of FIG. 3 makes use of the realm feature similar to that which is provided by standard 802.11i, wherein a realm identifier is sent in the initial packet exchange between the mobile unit and the access point at step 50. The realm can advantageously be associated with an organization or virtual network and therefore with a portal of distribution system 12. The access point receives this association request and compares at step 52 the realm in the association request with realms in the access point memory which are associated with portals 14 and tags for routing messages to portals 14 over distribution system 12. Optionally, the association request can be relayed by the access point to an authentication server as shown at 53 for verification that the mobile unit is associated with a realm and virtual network or to carry out other security features. If the realm identifier of the mobile unit corresponds to a tag in the memory of the access point that is associated with a portal, association is granted at step 54 and the identification of the mobile unit is associated with the tag corresponding to the realm identifier. The mobile unit then sends data messages with the mobile unit identifier to the access point at step 56. The access point compares the mobile unit identifier with mobile unit identifiers in its memory and assigns a tag to the message at step 58 and sends the message and its tag to the distribution system. The distribution system receives the message with the tag and routes it to the corresponding portal at step 60.

The system of the invention may provide different message security arrangements for each virtual LAN. The SSID used by the mobile unit for association can be mapped to an SSID/VLAN/Security entry. The access point enforces the selected security scheme by checking messages for valid key index usage as well as valid decryption. The security schemes may be Open, Shared Key WEP, Kerberos, Radius and EAP/TLS.

The term access point as used herein is intended to include a combination of a cell controller and RF ports as described in co-pending application Ser. No. 09/528,697, filed Mar. 17, 2000, which is assigned to the same assignee as this application, and which is incorporated herein by reference. In this type of system the functions of the access point may be performed in whole or in part by the cell controller.

While there have been described what are believed to be the preferred embodiments of the present invention, those skilled in the art will recognize that other and further changes and modifications may be made thereto without departing from the spirit of the invention, and it is intended to claim all such changes and modifications as all within the true scope of the invention.

We claim:

1. A method for operating multiple virtual wireless networks using a common distribution system comprising:
   providing portals from said distribution system to a plurality of local area network servers, each portal being associated with a tag for identifying messages for an associated local area network;
   providing at least one access point coupled to said distribution system, said access point including a memory;
   providing a wireless service set identification for each of said local area networks associated with said portals;
   providing mobile units having a service set identification associating said mobile units with one of said portals;
   providing data in said access point memory associating said service set identifications and tags associated with said portals;
   operating said mobile units to associate with at least one access point, said association including communicating a service set identification from said mobile unit to said access point;
   operating said mobile unit to communicate data to said associated access point, said communication including said service set identification of said mobile unit; and
   operating said access point to relay data messages from said associated mobile unit via said distribution system to said portal corresponding to the local area network associated with said service set identification, said relaying including verifying that said service set identification is associated with a local area message tag of said message in said access point memory.

2. A method as specified in claim 1 further comprising operating said access points to broadcast beacons having a single primary service set identification, and operating said access points to associate with mobile units having one of said primary service set identification and one or more secondary service set identifications, said primary and one or more service set identifications each being associated with a local area message tag in said access point memory.

3. A method as specified in claim 1 wherein said relaying by said access point includes including a tag in each relayed message corresponding to the tag associated in said access point memory with said service set identification included in said message from said mobile unit.

4. A method for operating multiple virtual wireless networks using a common distribution system comprising:
   providing portals from said distribution system to a plurality of local area network servers, each portal being associated with a tag for identifying messages for an associated local area network;
   providing at least one access point coupled to said distribution system, said access point including a memory;
   providing a realm identification for each of said local area networks associated with said portals;
   providing mobile units having a realm identification associating said mobile units with one of said portals;
   providing data in said access point memory associating said realm identifications and tags associated with said portals;
   operating said mobile units to associate with at least one access point, said association including communicating a realm identification from said mobile unit to said access point;
   operating said access point to associate with said mobile unit and associate said mobile unit with one of said tags associated with said portals in said access point memory; and
   operating said access point to relay data messages from said associated mobile unit via said distribution system to said portal corresponding to the local area network associated with said service set identification, said relaying including providing a local area message tag in said message corresponding to said portal associated with said mobile unit.

5. A system for providing multiple virtual wireless networks comprising:
   a distribution system;
   a plurality of portals coupled to said distribution system each corresponding to at least one network, each portal being associated with at least one tag for identifying messages for an associated network;
   a plurality of mobile units each having a service set identification associating said mobile unit with one of said networks;
   at least one access point coupled to said distribution system, said access point including a memory having data associating said service set identifications and tags;
   wherein said mobile units are arranged to associate with at least one access point, said association including communicating a service set identification from said mobile unit to said access point and to communicate data to said associated access point, said communication including said service set identification of said mobile unit; and
   wherein said access point are arranged to relay data messages from said associated mobile unit via said distribution system with a local area message tag to said portal corresponding to the local area network associated with said service set identification and arranged to verify that said service set identification is associated with said local area message tag of said message in said access point memory.

6. A system as specified in claim 5 wherein said access points are arranged to broadcast beacons having a single primary service set identification, and wherein said access points are arranged to associate with mobile units having one of said primary service set identification and one or more secondary service set identifications, said primary and one or more service set identifications each being associated with a local area message tag in said access point memory.

7. A method as specified in claim 5 wherein said access point are arranged to include a tag in each relayed message corresponding to the tag associated in said access point memory with said service set identification included in said message from said mobile unit.

8. A system for providing multiple virtual wireless networks comprising:
   a distribution system;
   a plurality of portals coupled to said distribution system each corresponding to at least one network, each portal being associated with at least one tag for identifying messages for an associated network;
   a plurality of mobile units each having a realm identification associating said mobile unit with one of said networks;
   at least one access point coupled to said distribution system, said access point including a memory having data associating said realm identifications and said tags;
   wherein said mobile units are arranged to associate with at least one access point, said association including communicating a realm identification from said mobile unit to said access point and to communicate data to said associated access point; and
   wherein said access point are arranged to relay data messages from said associated mobile unit via said distribution system with a local area message tag to said portal corresponding to the local area network associated with said realm identification in said access point memory.

* * * * *